US009591087B2

(12) United States Patent
Sinha et al.

(10) Patent No.: US 9,591,087 B2
(45) Date of Patent: Mar. 7, 2017

(54) METHOD AND SYSTEM FOR CREATING AN INTELLIGENT SOCIAL NETWORK BETWEEN A PLURALITY OF DEVICES

(71) Applicant: Tata Consultancy Services Limited, Maharashtra (IN)

(72) Inventors: Priyanka Sinha, West Bengal (IN); Chirabrata Bhaumik, West Bengal (IN); Avik Ghose, West Bengal (IN)

(73) Assignee: Tata Consultancy Services Limited, Maharashtra (IN)

( * ) Notice: Subject to any disclaimer, the term of this patent is extended or adjusted under 35 U.S.C. 154(b) by 109 days.

(21) Appl. No.: 14/369,263

(22) PCT Filed: Dec. 27, 2012

(86) PCT No.: PCT/IN2012/000858
§ 371 (c)(1),
(2) Date: Jun. 27, 2014

(87) PCT Pub. No.: WO2013/105115
PCT Pub. Date: Jul. 18, 2013

(65) Prior Publication Data
US 2015/0006656 A1  Jan. 1, 2015

(30) Foreign Application Priority Data
Dec. 27, 2011  (IN) .......................... 3674/MUM/2011

(51) Int. Cl.
G06F 15/16 (2006.01)
H04L 29/08 (2006.01)
(Continued)

(52) U.S. Cl.
CPC .............. *H04L 67/22* (2013.01); *H04L 51/32* (2013.01); *H04L 67/02* (2013.01); *H04L 67/10* (2013.01); *H04L 67/12* (2013.01); *H04L 67/306* (2013.01)

(58) Field of Classification Search
CPC ..... G06Q 10/107; H04L 12/585; H04L 12/58; H04L 12/581
(Continued)

(56) References Cited

U.S. PATENT DOCUMENTS 8,402,094 B2    3/2013  Bosworth
2008/0039121 A1*  2/2008  Muller ................ H04M 7/0036
                                                    455/456.3
(Continued)

FOREIGN PATENT DOCUMENTS

EP         2306683 A1   4/2011
WO    WO/2010/077960    7/2010

OTHER PUBLICATIONS

Dr. Patdoody and Mr. Shields, Institute of Technology Tralee, "Relationship Classification of Object to Object communications in the Internet of Things using Reality Mining" 2001.

*Primary Examiner* — Backhean Tiv
*Assistant Examiner* — Alan S Chou
(74) *Attorney, Agent, or Firm* — Hayes Soloway PC

(57) ABSTRACT

A method and system is provided for creating an intelligent social network between a plurality of devices participating in a social network over internet. Particularly, the disclosure provides a method and system for creating an intelligent social network of a plurality of devices, wherein an intent of at least one user of a first device is detected by one or more of subsequent devices out of the plurality of devices based on one or more pre-defined parameters; a match between one or more common intent of the user of the first device and the one or more users of the one or more subsequent devices
(Continued)

is detected and information pertaining to the same is transmitted for enabling communication and formation of intelligent social network between the first device and the one or more of subsequent devices.

13 Claims, 3 Drawing Sheets

(51) Int. Cl.
 *H04L 12/58* (2006.01)
 *G06F 15/173* (2006.01)
(58) Field of Classification Search
 USPC ........................................................ 709/206
 See application file for complete search history.

(56) References Cited

U.S. PATENT DOCUMENTS

| | | |
|---|---|---|
| 2008/0294678 A1 | 11/2008 | Gorman et al. |
| 2009/0198815 A1* | 8/2009 | Saba .................. G06Q 10/10 709/225 |
| 2009/0328122 A1 | 12/2009 | Amento et al. |
| 2010/0153989 A1 | 6/2010 | Jing et al. |
| 2010/0299615 A1 | 11/2010 | Miluzzo et al. |
| 2011/0145050 A1 | 6/2011 | Gross et al. |
| 2011/0161478 A1 | 6/2011 | Formo et al. |
| 2011/0258303 A1 | 10/2011 | Nath et al. |
| 2012/0123992 A1* | 5/2012 | Randall ............. G06F 17/30038 706/50 |
| 2013/0132861 A1* | 5/2013 | Kienzle ................ G06Q 10/10 715/753 |

\* cited by examiner

METHOD AND SYSTEM FOR CREATING AN INTELLIGENT SOCIAL NETWORK BETWEEN A PLURALITY OF DEVICES

FIELD OF THE DISCLOSURE

The present disclosure relates to social networking and internet. Particularly the disclosure provides a method and system for creating an intelligent social network between a plurality of devices participating in a social network over internet

BACKGROUND OF THE DISCLOSURE

With the advent of computers, calculating and predicting efforts of human being were taken up by computers. With the advent of the online social networks, significant part of social life of a human being was taken up by online social networks based on the computing and communicating devices. The social networking platforms are used for participation and interaction among people.

Social networking platform available at this point of time, allows users to upload and share their personal or professional updates for their peer group to view and comment. Social networking platforms such as Facebook, Orkut, Twitter, Myspace, Friendster allows users to engage in virtual activities like games, chats, watching of videos in a virtual social community. However, most of these updates are generated by users only by inputting data through a physical computing device and very little of their daily status updates are enhanced by intelligent devices around them. User may find that they spend a disproportionate amount of time in maintaining their virtual lives, which eventually start hampering their real lives.

Apart from the user participating in social networking platform, devices participating in social networking platform are employed to generate a lot of data pertaining to users using said social networking platform and that can augment information in a social network. In the current scenario, there is no intent model for devices in existing social networks and also there is no framework for devices to augment existing human social networks.

Thus, in the light of the above mentioned background, it is evident that there is a need for a solution that can create an intelligent social network of devices over internet, which can associate social behavior with non human objects and things such as devices participating in social networking platform.

OBJECTIVES OF THE DISCLOSURE

In accordance with the present disclosure, the primary objective is to provide a method and system for creating an intelligent social network between a plurality of devices participating in a social network over internet Another objective of the disclosure is to provide a method and system for detecting user intent of first device by one or more subsequent devices based on pre-defined parameters.

Another objective of the disclosure is to provide a method and system for detecting intent of user of a first device by one or more subsequent devices out of the plurality of devices based on one or more pre-defined parameter.

Another objective of the disclosure is to provide a method and system for detecting a match between the one or more common intent of the user of the first device and the one or more users of the one or more subsequent devices based on said one or more pre-defined parameter.

Another objective of the disclosure is to provide a method and system for transmitting information pertaining to the one or more detected common intent of the user of the first device to one or more subsequent devices by said first device.

Another objective of the disclosure is to provide a method and system for enabling communication and formation of intelligent social network between the first device and the one or more of subsequent devices.

Yet another objective of the disclosure is to provide a method and system for creating and maintaining device profiles over internet, for participating in the internet based social network of devices.

SUMMARY OF THE DISCLOSURE

Before the present methods, systems, and hardware enablement are described, it is to be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

The present disclosure provides a method and system for creating an intelligent social network between a plurality of devices participating in a social network over the Internet.

In an embodiment of the disclosure a method and system is provided for detecting user intent of a user of a first device with one or more subsequent devices based on pre-defined parameters.

In an embodiment of the disclosure a method and system is provided for detecting intent of a user of a first device with one or more of subsequent devices out of the plurality of devices based on one or more pre-defined parameter.

In an embodiment of the disclosure a method and system is provided for detecting a match between the detected intent of the user of the first device and one or more users of the one or more subsequent devices based on said one or more pre-defined parameter.

In an embodiment of the disclosure a method and system is provided for transmitting a quantity of information pertaining to the one or more detected intent of the user of the first device to one or more subsequent devices by said first device.

In an embodiment of the disclosure a method and system is provided for enabling communication and formation of an intelligent social network between the first device and the one or more of subsequent devices.

In an embodiment of the disclosure a method and system is provided for creating and maintaining device profiles over the Internet, for participating in the Internet based social network of devices.

In an embodiment of the disclosure a method and system is provided for creating and maintaining device profiles over the Internet, for participating in the Internet based social network of devices.

In an embodiment of the disclosure a system is provided for creating an intelligent social network of devices over the Internet, wherein the system comprises a first device (202) and one or more of subsequent devices (204) adapted to detect a match between one or more common intent of the user of the first device (202) and the one or more users of the one or more subsequent devices (204) based on one or more pre-defined parameter and wherein information pertaining to the one or more detected common intent of the user of the first device (202) is transmitted to one or more subsequent devices (204) by said first device (202) using representational state transfer (REST) API (210); a residential gateway (208) running on a web server hosted on the Internet, wherein the residential gateway facilitates communication to the web server in cases of constrained sensors; and a database adapted to store corresponding values of said one or more pre-defined parameter and a social profile of the plurality of devices participating in the intelligent social network (220).

The above said method and system are preferably for creating an intelligent social network of devices over the Internet but also can be used for many other applications.

BRIEF DESCRIPTION OF THE DRAWINGS

The foregoing summary, as well as the following detailed description of preferred embodiments, are better understood when read in conjunction with the appended drawings. For the purpose of illustrating the disclosure, there is shown in the drawings exemplary constructions of the disclosure; however, the disclosure is not limited to the specific methods and system disclosed. In the drawings.

DETAILED DESCRIPTION OF THE DISCLOSURE

Figure 1:
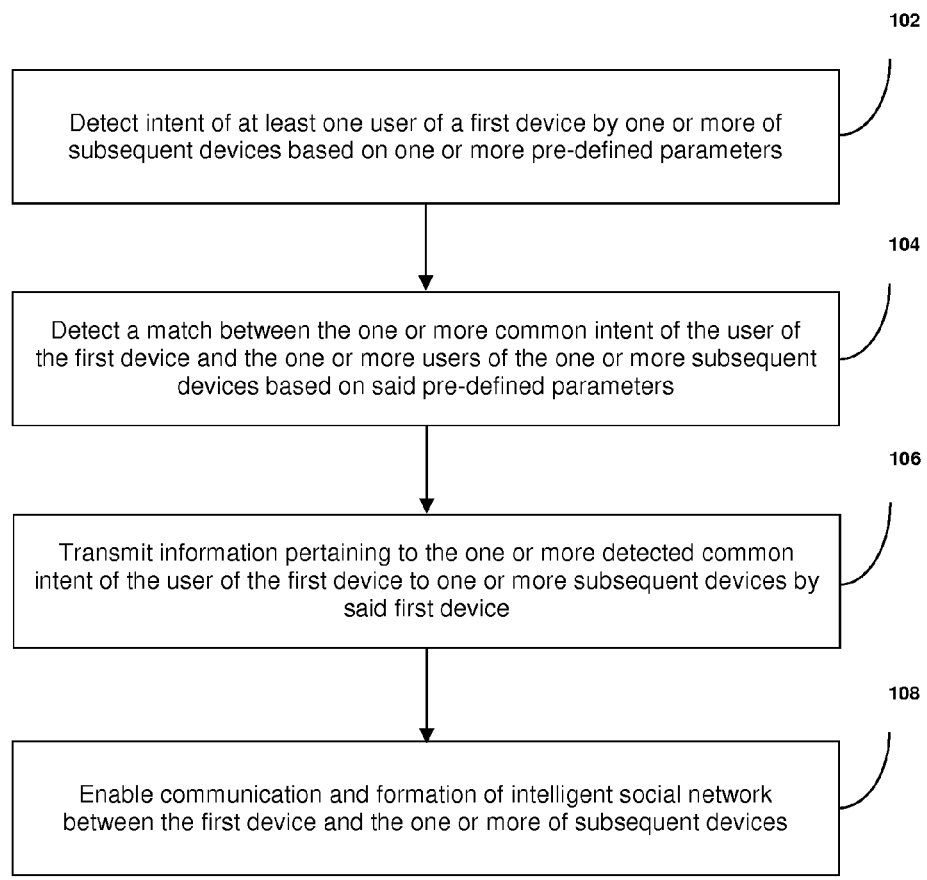
FIG. 1: shows a flow diagram of the process for creating intelligent social network of devices

Some embodiments of this disclosure, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

The disclosed embodiments are merely exemplary of the disclosure, which may be embodied in various forms.

The present application provides a method for creating an intelligent social network (220) between a plurality of devices participating in a social network over internet; the method comprises processor implemented steps of:
  a. detecting intent of at least one user of a first device (202) by one or more of subsequent devices (204) out of the plurality of devices based on one or more pre-defined parameter;
  b. detecting a match between the one or more common intent of the user of the first device (202) and the one or more users of the one or more subsequent devices (204) based on said one or more pre-defined parameter;
  c. transmitting information pertaining to the one or more detected common intent of the user of the first device (202) to one or more subsequent devices (204) by said first device (202); and
  d. enabling communication and formation of intelligent social network (220) between the first device (202) and the one or more of subsequent devices (204).

The present application provides a system for creating an intelligent social network (220) between a plurality of devices participating in a social network over internet, wherein the system comprising of:
  a. a first device (202) and one or more of subsequent devices (204) adapted to detect a match between one or more common intent of the user of the first device (202) and the one or more users of the one or more subsequent devices (204) out of the plurality of devices based on one or more pre-defined parameter and further transmitting information pertaining to the one or more detected common intent of the user of the first device (202) to one or more subsequent devices (204) by said first device (202) using representational state transfer (REST) API (210);
  b. a residential gateway (208) running on a web server hosted on the internet and facilitating communication to the web server in cases of constrained devices/sensors; and
  c. a database adapted to store corresponding values of said one or more pre-defined parameter and social profile of the plurality of devices participating in the social network (220).

Referring to FIG. 1 is a flow diagram of the process for creating intelligent social network of devices.

The process starts at the step 102, intent of at least one user of a first device is detected by one or more of subsequent devices out of the plurality of devices based on one or more pre-defined parameters. At the step 104, a match is detected between the one or more common intent of the user of the first device and the one or more users of the one or more subsequent devices based on said one or more pre-defined parameters. At the step 106, information pertaining to the one or more detected common intent of the user of the first device is transmitted to one or more subsequent devices by said first device. The process ends at the step 108, communication and formation of intelligent social network is enabled between the first device and the one or more of subsequent devices.

In an embodiment of the disclosure, in the social networking platforms, people participate whereas devices do not. Devices can generate a lot of data that can augment information in a social network. The devices are used to detect user activity and allow other users to interact using that information, thereby creating an immersion of real and virtual worlds. It also discusses the enabling technology in creating and maintaining a social network of devices. The present disclosure allows devices to discover and update user's context like presence as they move to different locations, real life activities such as watching television and moods. It also depicts how people react to such updates and thereby interact with each other. Considering the example of television, the television may tweet the information pertaining to the program on Twitter, which the user is watching. The Tweet informs user's followers on Tweeter and friends. When user's friends or followers are watching the same program or channel, they become "closer" friends in the virtual world and your "trust" in them automatically upgrades.

Figure 2:
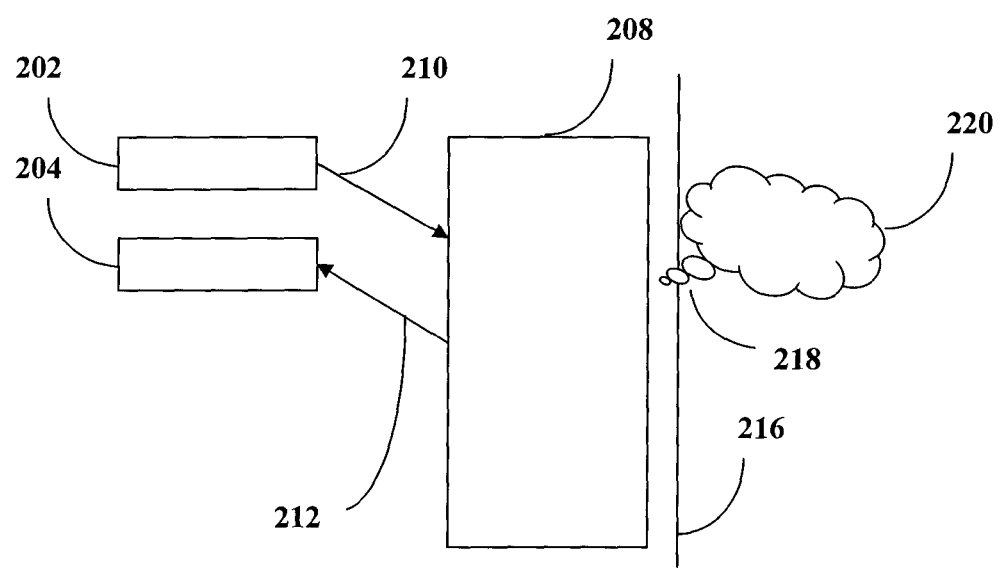
FIG. 2: shows a block diagram of the process for creating intelligent social network of devices

Referring to FIG. 2 is a block diagram of the process for creating intelligent social network of devices.

In an embodiment of the disclosure, the system for creating intelligent social network of devices comprises of a First Device (202), a Subsequent Device (204), a Residential gateway (208), an Representational State Transfer (REST) API (210), a Feedback (CE-HTML) (212) application, a Home boundary (216), an Oauth (218) and a social network (220).

In an embodiment of the disclosure, the method is provided for creating intelligent social network of devices, wherein the plurality of devices are selected from the group comprising but not limited to sensing devices, transmitting devices, receiving devices, computing devices, or mobile communication devices.

In an embodiment of the disclosure, the method is provided for creating intelligent social network of devices, wherein the an intent of at least one user of a First Device (202) is detected by one or more of Subsequent Devices (204) out of the plurality of devices based on one or more pre-defined parameters. The pluralities of devices are also enabled to update user context using common intent of the users. The one or more pre-defined parameter is selected from the group comprising of time, user activity, and repetition of user activity or historical data and further stored in a database. The data pertaining to the one or more pre-defined parameter is being collected from sensors from the group comprising of GPS, GPRS or RFIDs.

A match is detected between the one or more common intent of the user of the First Device (202) and the one or more users of the one or more Subsequent Devices (204) based on said one or more pre-defined parameters. Information pertaining to the one or more detected common intent of the user of the First Device (202) is then transmitted to one or more Subsequent Devices (204) by said First Device (202) enabling communication and formation of intelligent social network (220) between the First Device (202) and the one or more of Subsequent Devices (204).

In an embodiment of the disclosure, the system for creating intelligent social network of devices, wherein the First Device (202), the Subsequent Device (204) uses representational state transfer (REST) API (210) to talk to the Residential gateway (208) running on a web server. The Subsequent Device (204) may support a Feedback (CE-HTML) (212) application to display the XHTML responses. The Subsequent Device (204) is adapted to receive the HTTP response feedback to request sent via the representational state transfer (REST) API (210) by one or more subsequent devices (204) using consumer electronics-hyper text markup language (CE-HTML) (212) application to display the XHTML responses from the residential gateway (208) running on the web server. The social networking data of the first device (202) and the subsequent devices (204) is obtained using an open authorization (Oauth) (218) adapted to connect to the social network (220) via the Residential gateway (208) across the Home Boundary (216).

In an embodiment of the disclosure, the method is provided for creating and maintaining social profile of the plurality of devices participating in the social network (220) using 'device identification' of the devices and further stored in the database, wherein the social data is stored in a social graph database Neo4J and is maintained in PostGIS. The social profile of the plurality of devices participating in the social network (220) is obtained by auto analyzing the historical behavior of the plurality of devices or by common intent which is independent of historical data.

WORKING EXAMPLE OF THE DISCLOSURE

Figure 3:
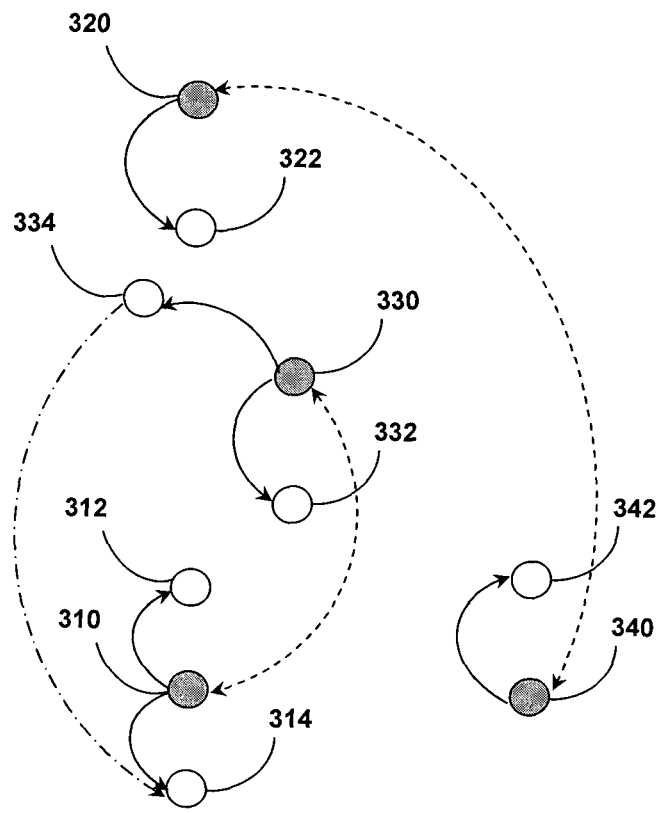
FIG. 3: shows a social network graph for a carpool application intelligent social network of devices

Referring to FIG. 3 is a social network graph for a carpool application intelligent social network of devices.

In an embodiment of the disclosure, the method and system for creating intelligent social network of devices, wherein certain devices augment a person's social network, comprises of a Person A (310), a Person A's GPS sensor (312), a Person A's mobile phone (314), a Person B (320), a Person B's GPS sensor (322), a Person C (330), a Person C's GPS sensor (332), a Person C's accelerometer (334), a Person D (340), and Person D's GPS sensor (342).

In an embodiment of the disclosure, multiple users using different automobiles for commuting along a common path on a regular basis may socially connect due to common intent of automobile pooling such as car pooling wherein the automobile is a car. The cars themselves find potential car pool buddies and notify the owners using cars. For example, cars on the road may be able to cache the Wifi MAC id of the broadcasting cars in radio range. Over a week, the cache consists of those cars Wifi MAC ids which have been encountered most often which may be of potential social connect. These cars may be sent friend requests, which the owners may review and accept if required, or the cars may autonomously form friends. Once the communication is established, these MAC ids, owners' mobile phone, GPS sensor and accelerometer will be traced regularly to extrapolate the routes of the cars, such as the Person A's mobile phone (314) communicates with the Person A's GPS sensor (312) and Person C's accelerometer (334) along with the social network of people involved to list of the possible carpool buddies for a person needing a ride. Once the routes are stabilized or a pattern is detected, the same is matched with owner's car route patterns for a match. Then, social identities of the owners are automatically compared to measure their social distance in online social networks. If that is below the acceptable threshold of risk (such as $2^{nd}$ degree friends may be the threshold), the matched route is suggested for potential carpool to the cars owners for review and necessary action.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A computer implemented method for creating an intelligent social network between a plurality of devices participating in a social network over Internet, the method comprising processor implemented steps of:
   detecting an intent of at least one user of a first device with at least one subsequent device of the plurality of devices based on at least one pre-defined parameter, wherein user activity is detected by the plurality of devices to facilitate said at least one user for interaction;
   detecting a match between the detected intent of the at least one user of the first device and at least one second user of the at least one subsequent device based on said at least one pre-defined parameter;
   transmitting a quantity of information pertaining to the detected intent of the at least one user of the first device to the at least one subsequent device by said first device;
   enabling communication and formation of the intelligent social network between the first device and the at least one subsequent device, wherein the first device utilizes a representational state transfer (REST) API for connecting to a residential gateway running on a web server;
   obtaining social networking data of the first device and the at least subsequent device using an open authorization (Oauth) adapted to connect to the intelligent social network via the residential gateway, wherein the social networking data is stored in a social graph database Neo4J and is maintained in PostGIS;
   discovering and updating information relating to a context of at the least one user, based on at least one of a location of the user, an activity of the least one user, and the detected intent of the least one user; and
   auto-analyzing a historical behavior of the said plurality of devices from a social profile of said plurality of devices participating in the intelligent social network.

2. The computer implemented method as claimed in claim 1, wherein the at least one pre-defined parameter further comprises at least one of time, user activity, repetition of user activity and historical data.

3. The computer implemented method as claimed in claim 2, wherein data pertaining to the at least one pre-defined parameter is collected from a sensor, wherein the sensor further comprises at least one of GPS, GPRS, and RFIDs.

4. The computer implemented method as claimed in claim 1, wherein the first device is communicating with the at least one subsequent device by receiving a HTTP response feedback to a request sent via the REST API by the at least one subsequent device using a consumer electronics-hyper text markup language (CE-HTML) application to display the HTTP response feedback from the residential gateway of the plurality of devices running on the web server.

5. The computer implemented method as claimed in claim 1, further comprising creating, maintaining and storing the social profile of the plurality of devices participating in the intelligent social network using device identification of the plurality of devices in a database.

6. The computer implemented method as claimed in claim 1, wherein the plurality of devices further comprises at least one of: sensing devices, transmitting devices, receiving devices, computing devices, and mobile communication devices.

7. The computer implemented method as claimed in claim 1, further comprising utilizing the social network of the at least one user and the at least one second user by the plurality of devices.

8. A computer implemented system for creating an intelligent social network between a plurality of devices participating in a social network over Internet, wherein the system comprises:
   a first device and at least one subsequent device adapted to
      detect a match between at least one common intent of a user of the first device and at least one user of the at least one subsequent device based on at least one pre-defined parameter, wherein information pertaining to the at least one detected common intent of the user of the first device is transmitted to the at least one subsequent device by said first device using representational state transfer (REST) API, wherein the first device and the subsequent device are configured to detect user activity and facilitate the user to interact using said information and wherein the subsequent device is adapted to receive a response feedback to a request sent via a representational state transfer (REST) application programming interface (API); and obtain social networking data of the first device and the at least one subsequent device using an open authorization (Oauth) connected to the intelligent social network via a residential gateway, wherein the social networking data is stored in a social graph database Neo4.1 and is maintained in PostGIS;

wherein the residential gateway runs on a web server hosted on the Internet, wherein the residential gateway facilitates communication to the web server in cases of constrained sensors; and a database adapted to store corresponding values of said at least one pre-defined parameter and a social profile of the plurality of devices participating in the intelligent social network.

9. The system as claimed in claim 8, wherein the at least one pre-defined parameter further comprises at least one of time, user activity, repetition of user activity and historical data, wherein corresponding values of said at least one pre-defined parameter are stored in the database.

10. The system as claimed in claim 8, wherein the at least one subsequent device is adapted to receive a feedback using a consumer electronics-hyper text markup language (CE-HTML) application to display the XHTML responses from the residential gateway running on a web server.

11. The system as claimed in claim 8, wherein the residential gateway is adapted to support a representational state transfer (REST) API web server and cache open authorization (Oauth) tokens with multiple network interfaces for facilitating communication to the web server in cases of constrained sensors.

12. The system as claimed in claim 8, wherein the cases of constrained sensors includes at least one of a GPS sensor, a GPRS sensor, and a RFID sensor.

13. The system as claimed in claim 8, wherein the plurality of devices further comprises at least one of: sensing devices, transmitting devices, receiving devices, computing devices, and mobile communication devices.

* * * * *

UNITED STATES PATENT AND TRADEMARK OFFICE
CERTIFICATE OF CORRECTION

PATENT NO.       : 9,591,087 B2
APPLICATION NO.  : 14/369263
DATED            : March 7, 2017
INVENTOR(S)      : Sinha et al.

It is certified that error appears in the above-identified patent and that said Letters Patent is hereby corrected as shown below:

In the Claims

Column 9, Claim 8, Line 6, "Neo4.1", should be --Neo4J--.

Signed and Sealed this
Tenth Day of April, 2018

Andrei Iancu
*Director of the United States Patent and Trademark Office*